United States Patent
Hossain et al.

(10) Patent No.: US 6,296,955 B1
(45) Date of Patent: Oct. 2, 2001

(54) HIGH MOMENT AND HIGH PERMEABILITY TRANSDUCER STRUCTURES AND FORMATION

(75) Inventors: Syed A. Hossain, Fremont; Mark S. Miller, Danville; Devendra P. Rathi, San Jose, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/317,795

(22) Filed: May 24, 1999

(51) Int. Cl.$^7$ .................................................. G11B 5/66
(52) U.S. Cl. ................ 428/692; 428/694 R; 428/694 T; 428/694 TS; 428/694 TM; 428/900; 360/119; 360/120; 360/122; 360/123; 360/125; 360/126
(58) Field of Search ..................... 360/119, 120, 360/122, 123, 125, 126; 428/694 R, 694 T, 694 TS, 900

(56) References Cited

U.S. PATENT DOCUMENTS

| | | | |
|---|---|---|---|
| 4,589,042 | * 5/1986 | Anderson | 360/125 |
| 5,668,523 | 9/1997 | Chen et al. | 338/32 |
| 5,668,687 | 9/1997 | Chen et al. | 360/113 |
| 5,812,350 | * 9/1998 | Chen | 360/126 |
| 5,864,450 | 1/1999 | Chen et al. | 360/113 |
| 5,874,010 | 2/1999 | Tao et al. | 216/22 |

* cited by examiner

*Primary Examiner*—Leszek Kiliman
(74) *Attorney, Agent, or Firm*—Mark Lauer

(57) ABSTRACT

Magnetically permeable, high magnetic saturation, primarily iron NiFe alloys are formed on thin seed layers by sputtering and electroplating. Pole layers a few microns in thickness can be formed of magnetically superlative, primarily iron NiFe alloys in this manner for transducers that may be used in information storage systems. The seed layers may include $Ni_{0.55}Fe_{0.45}$ or Cr, and the magnetically superlative NiFe alloy may be $Ni_{0.45}Fe_{0.55}$. The magnetically superlative NiFe alloy has increased concentration of a body centered cubic crystalline phase and/or a decreased concentration of a face centered cubic crystalline phase compared with conventional $Ni_{0.45}Fe_{0.55}$. A laminated pole structure has a dielectric interlayer along with seed layers and magnetically superlative, primarily iron NiFe layers.

26 Claims, 4 Drawing Sheets

HIGH MOMENT AND HIGH PERMEABILITY TRANSDUCER STRUCTURES AND FORMATION

TECHNICAL FIELD

The present invention relates to magnetic devices, for example electromagnetic transducers of disk or tape storage systems.

BACKGROUND OF THE INVENTION

Electromagnetic transducers such as heads for disk or tape drives commonly include Permalloy (approximately $Ni_{0.8}Fe_{0.2}$), which is formed in thin layers to create magnetic features. For example, an inductive head may have conductive coils that induce a magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR sensors may use thinner layers of Permalloy to read signals, by sensing a change in electrical resistance of the MR sensor that is caused by the magnetic signal.

In order to store more information in smaller spaces, transducer elements have decreased in size for many years. One difficulty with this deceased size is that the amount of flux that needs to be transmitted may saturate elements such as magnetic pole layers, which becomes particularly troublesome when ends of the pole layers closest to the media, commonly termed poletips, are saturated. Magnetic saturation in this case limits the amount of flux that is transmitted through the poletips, limiting writing or reading of signals. Moreover, such saturation may blur that writing or reading, as the flux may be evenly dispersed over an entire poletip instead of being focused in a corner that has relatively high flux density. For these reasons the use of high magnetic moment materials in magnetic core elements has been known for many years to be desirable. For instance, iron is known to have a higher magnetic moment than nickel, so increasing the proportion of iron compared to nickel generally yields a higher moment alloy. Iron, however, is also more corrosive than nickel, which imposes a limit to the concentration of iron that is feasible. Also, it is difficult to achieve soft magnetic properties for iron-rich NiFe compared to nickel-rich NiFe.

Anderson et al., in U.S. Pat. No. 4,589,042, teach the use of high moment $Ni_{0.45}Fe_{0.55}$ for poletips. Anderson et al. do not use $Ni_{0.45}Fe_{0.55}$ throughout the core due to problems with permeability of that material, which Anderson et al. suggest is due to magnetostriction characteristics of $Ni_{0.45}Fe_{0.55}$. As noted in U.S. Pat. No. 5,606,478 to Chen et al., the use of high moment materials has also been proposed for layers of magnetic cores located closest to a gap region separating the cores. Also noted by Chen et al. are some of the difficulties presented by these high moment materials, including challenges in forming desired elements and corrosion of the elements once formed. Chen et al. note that magnetostriction is another problem with $Ni_{0.45}Fe_{0.55}$, and teach the importance of constructing of heads having Permalloy material layers that counteract the effects of that magnetostriction. This balancing of positive and negative magnetostriction with plural NiFe alloys is also described in U.S. Pat. No. 5,874,010 to Tao et al.

SUMMARY OF THE INVENTION

In the present invention, problems in forming a magnetically favorable, primarily iron NiFe alloy were overcome. Magnetically permeable, high magnetic saturation (high $Ni_{0.45}Fe_{0.55}$ has been achieved by forming thin seed layers that allow the formation of primarily iron NiFe alloys by sputtering and electroplating. Pole layers a few microns in thickness can be formed of magnetically superlative, primarily iron NiFe alloys in this manner.

DESCRIPTION OF THE INVENTION

Figure 1:
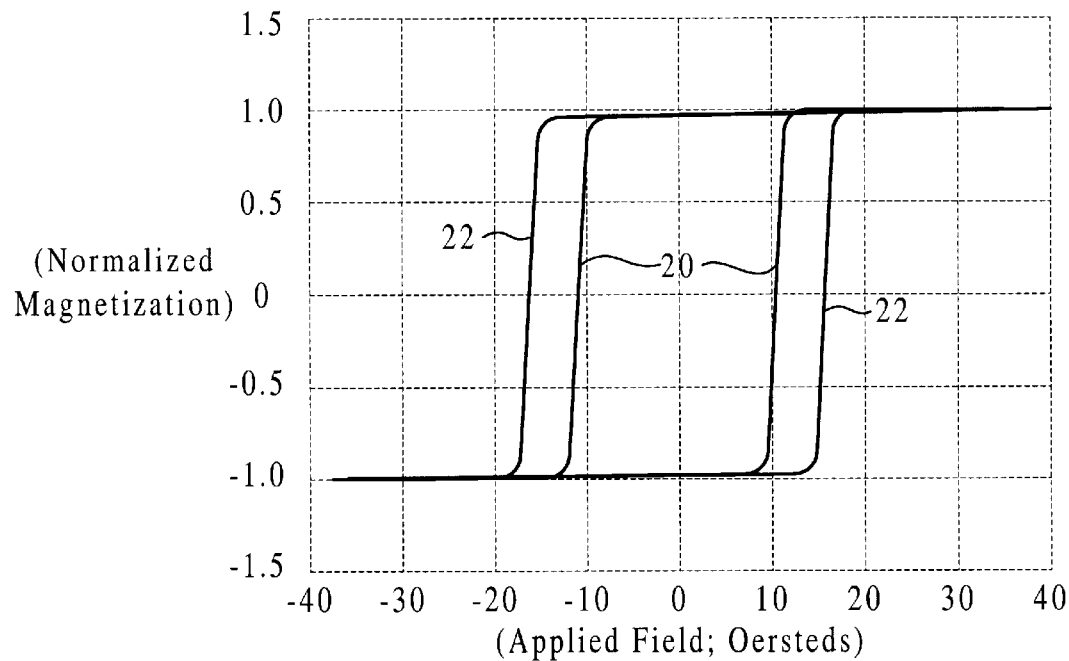
FIG. 1 is a plot of applied and induced magnetic fields (a B/H loop) of a conventional layer of sputter-deposited $Ni_{0.45}Fe_{0.55}$.

FIG. 1 shows B/H loops of an approximately 1000 Å thick $Ni_{0.45}Fe_{0.55}$ layer that was formed by conventional sputter deposition. As noted in Chen et al., such a layer may be formed adjacent to a gap for a trailing write pole, prior to electroplating the remainder of that pole, and thus may be disposed in a location in which high $B_s$ as well as high permeability is most important. The applied H-field is shown in oersteds (Oe) across the horizontal axis while the magnetization of the layer is plotted in normalized units along the vertical axis, with unity defined as the saturation magnetization for a given material. An inner loop 20 is measured along a hard axis of the layer, while an outer loop 22 is a plot measured along an easy axis of the layer. The loops can be seen to be nearly rectangular, indicating poor permeability and a lack of uniaxial anisotropy. The coercivity of the hard axis, which is defined as the applied field of the loop 20 at which the magnetization is zero, is about 11 Oe, while the coercivity of the easy axis is about 16 Oe.

Figure 2:
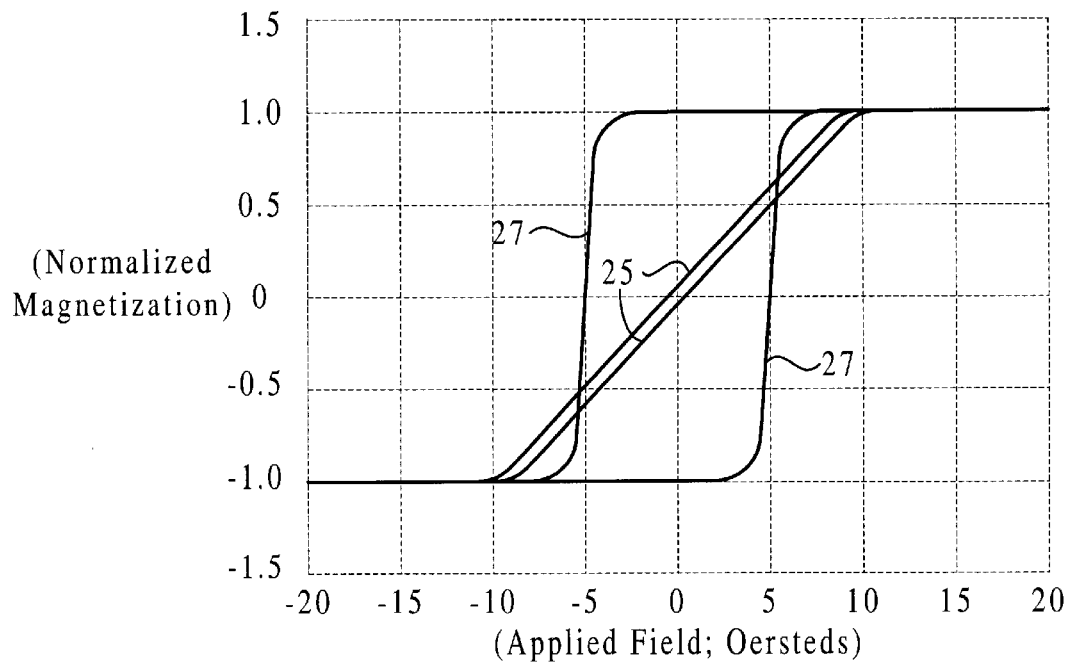
FIG. 2 is a plot of a B/H loop of a magnetically superior layer of the present invention made of sputter-deposited $Ni_{0.45}Fe_{0.55}$ grown on a seed of sputter-deposited $Ni_{0.55}Fe_{0.45}$.

FIG. 2 shows B/H loops of an approximately 1000 Å thick $Ni_{0.45}Fe_{0.55}$ layer that was formed by sputter deposition according to the present invention. A hard axis B/H loop 25 has a lesser slope than that of an easy axis B/H loop 27, indicating more gradual change of the B field within the layer in response to the H field. Note the dramatically reduced coercivity for both the hard and easy axis of this layer, as well as the greatly increased permeability, compared to that of the conventional layer shown in FIG. 1. The easy axis of the layer plotted in FIG. 2 has a coercivity that is about 5 Oe, while the hard axis coercivity may be less than 1 Oe. As above, the magnetization scale has been normalized to one, reflecting the approximately 16-kiloGauss magnetization saturation level of $Ni_{0.45}Fe_{0.55}$. By contrast, Permalloy ($Ni_{0.8}Fe_{0.2}$) has a saturation flux of about 10-kiloGauss, whereas $Ni_{0.55}Fe_{0.45}$ has a saturation flux of about 14.5-kiloGauss.

To achieve the results shown in FIG. 2, a thin initial seed layer of $Ni_{0.55}Fe_{0.45}$, approximately 25 Å in thickness, was first formed by sputter deposition, after which the $Ni_{0.45}Fe_{0.55}$ was sputter-deposited. The formation of both these layers occurred at an elevated temperature of about 175° C. –180° C. A reason for the significant improvement shown in FIG. 2 is believed to involve a change in crystalline structure of the $Ni_{0.45}Fe_{0.55}$ layer grown on the thin initial seed layer at an elevated temperature. Such a thin initial seed layer is not conventionally present in magnetic layers for inductive components. Instead, a sputtered layer of Permalloy that is approximately 1000 Å thick is commonly formed as a seed layer that provides a conductor for electroplating a few microns of Permalloy, with the seed and electroplated Permalloy together forming a write pole, for example. Alternatively, Chen et al. teaches formation of a layer of $Ni_{0.45}Fe_{0.55}$ such as discussed above with regard to FIG. 1.

Conventional $Ni_{0.45}Fe_{0.55}$ has a face centered cubic (FCC) crystalline structure, however, when deposited on $Ni_{0.55}Fe_{0.45}$ in combination with heat, the FCC phase is reduced and a body-centered cubic (BCC) crystalline phase may result. The formation of $Ni_{0.45}Fe_{0.55}$ having an increased concentration of BCC phase and/or reduced concentration of FCC phase crystalline structure is also accomplished in other embodiments of the present invention. The temperature chosen for this formation may range between about 100° C. and 200° C., and in some cases may be nearly high enough to destroy sensitive MR elements that are formed prior to the formation of a $Ni_{0.45}Fe_{0.55}$ write pole. Alternatively, for the situation in which a write pole is formed prior to MR elements, or for a head or other device that does not include MR elements, the formation temperature may be higher.

Sputter deposition of the $Ni_{0.55}Fe_{0.45}$ and the $Ni_{0.45}Fe_{0.55}$ layers plotted in FIG. 2 preferably takes place in a chamber evacuated to a pressure of less than about $2\times10^{-7}$ Torr, in the presence of an aligning field of about 60 Oe to 100 Oe. A preferred temperature range for forming these layers is about 170° C. –190° C. Deposition of an initial seed of $Ni_{0.55}Fe_{0.45}$ preferably occurs at [7.5 –26]Watts/square-inch power density to reach a thickness of 20 Å–100 Å, while that of $Ni_{0.45}Fe_{0.55}$ preferably occurs at [3.7–10]Watts/square-inch power density to reach a thickness of 500 Å–10,000 Å. The aligning field should be maintained while the NiFe layers and any adjoining layers and substrate are cooled to a temperature of less than about 50° C.

Figure 3:
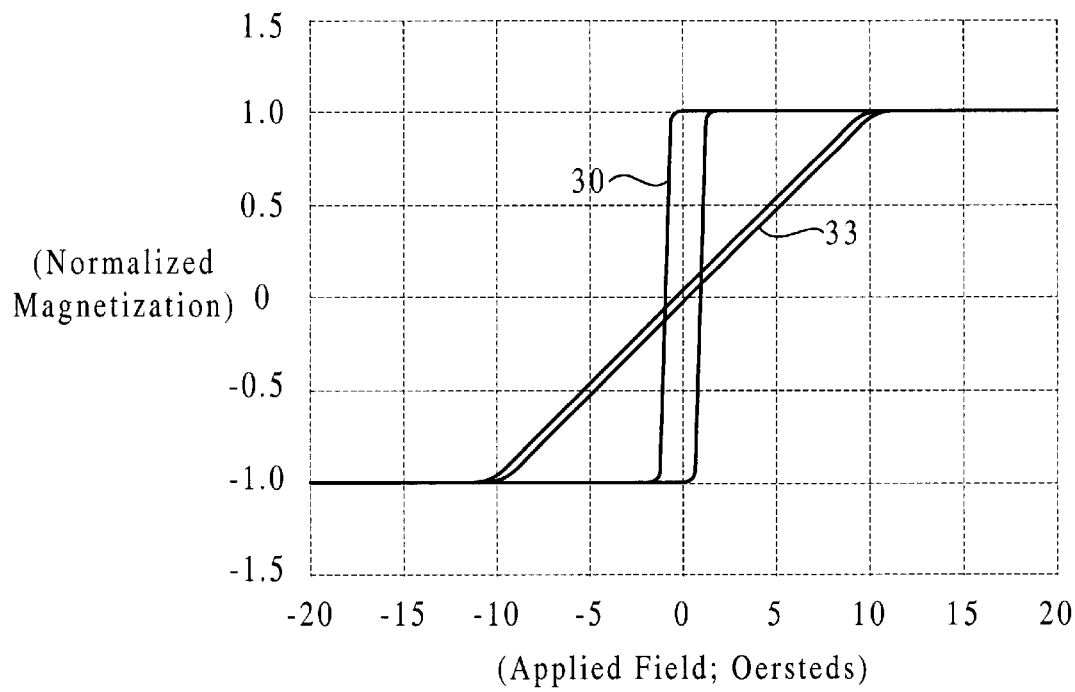
FIG. 3 is a plot of a B/H loop of a magnetically superior layer of the present invention made of electroplated $Ni_{0.45}Fe_{0.45}$ formed on sputter-deposited $Ni_{0.45}Fe_{0.55}$ grown on a seed of sputter-deposited $Ni_{0.55}Fe_{0.45}$.

FIG. 3 shows B/H loops of a composite film of the present invention including a first seed layer of $Ni_{0.55}Fe_{0.45}$ having a thickness of about 50 Å, a second seed layer of $Ni_{0.45}Fe_{0.55}$ having a thickness of about 1000 Å, and an electroplated film of $Ni_{0.45}Fe_{0.55}$. The composite film in this example has an overall thickness of about 2 µm, while other films having an overall thickness of 1 µm to 5 µm display similar magnetic properties. An easy axis B/H loop is labeled 30 and a hard axis B/H loop is labeled 33. This composite film can be seen to have magnetically superior properties including a magnetic saturation of about 16-kiloGauss.

Table 1 compares the characteristics of the prior art seed of pure $Ni_{0.45}Fe_{0.55}$ (labeled 45/55 seed) with the present invention seed of $Ni_{0.55}Fe_{0.45}$ and $Ni_{0.45}Fe_{0.55}$ (labeled 55/45-45/55 seed) and the present invention of $Ni_{0.45}Fe_{0.55}$ electroplated on a seed of $Ni_{0.55}Fe_{0.45}$ and $Ni_{0.45}Fe_{0.55}$ (labeled 55/45-45/55 plated).

TABLE 1

| material | Hce | Hch | Hk | total thickness |
|---|---|---|---|---|
| 45/55 seed | 16.1 Oe | 10.9 Oe | — | @ 1000 Å |
| 55/45-45/55 seed | 5.4 Oe | 0.15 Oe | 8.5 Oe | @ 1000 Å |
| 55/45-45/55 seed-45/55 plated | 1.0 Oe | 0.28 Oe | 9.23 Oe | @ 2.0 µm |

The conventional $Ni_{0.45}Fe_{0.55}$ seed has a much higher easy axis coercivity (Hce) and hard axis coercivity (Hch). Due to the lack of anisotropy for the conventional $Ni_{0.45}Fe_{0.55}$ seed, Hk is not measurable for the prior art sample, whereas it is less than 1 Oe for the inventive layers.

Figure 4:
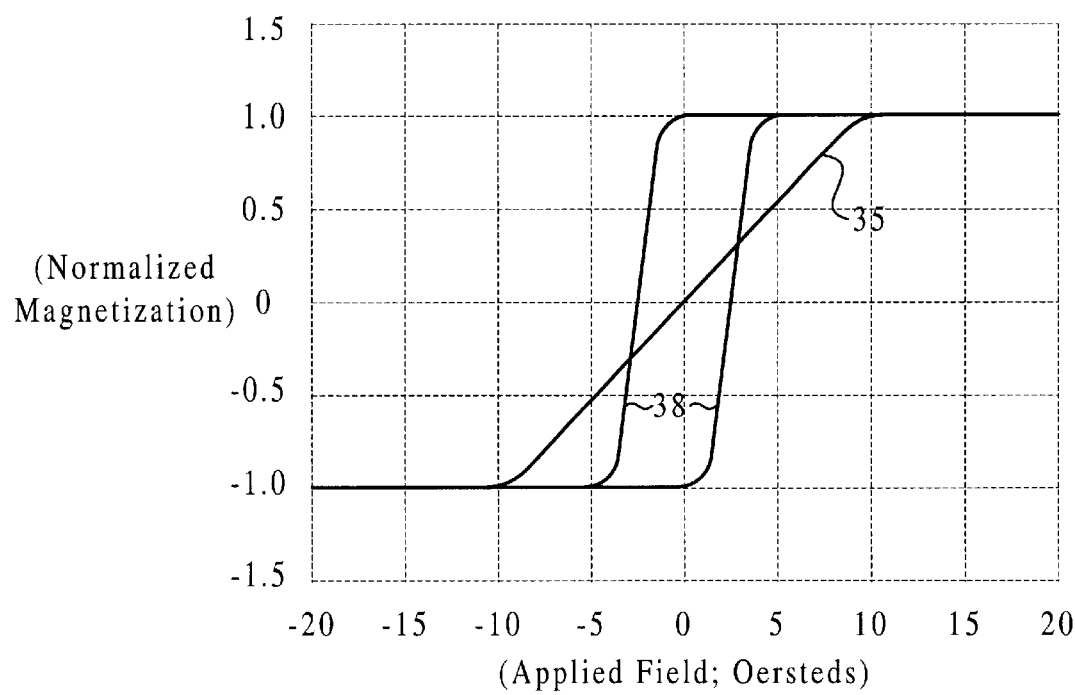
FIG. 4 is a plot of a B/H loop of a magnetically superior layer of the present invention made of sputter-deposited $Ni_{0.45}Fe_{0.55}$ grown on a seed of sputter-deposited Cr.

FIG. 4 shows B/H loops of $Ni_{0.45}Fe_{0.55}$ that has been formed by sputter deposition on a 25 Å thick layer of Cr that was sputter-deposited on glass. A hard axis B/H loop 35 shows superlative permeability and such low coercivity that no hysteresis is evident, and an easy axis B/H loop 38 also is favorable. An advantage of having a Cr initial layer is that sputter deposition of thicker $Ni_{0.45}Fe_{0.55}$ layers may be possible. Since the initial seed layer of Cr is covered with a layer of $Ni_{0.45}Fe_{0.55}$, potential problems with adverse chemical reactions during electroplating $Ni_{0.45}Fe_{0.55}$ are avoided. In this example, the sputter-deposited layer of $Ni_{0.45}Fe_{0.55}$ is about 1 µm in thickness. Atop this sputtered $Ni_{0.45}Fe_{0.55}$ layer a thin layer of $Al_2O_3$ may be sputter-deposited, after which another Cr seed and $Ni_{0.45}Fe_{0.55}$ layer can be sputter-deposited to form a laminated pole layer.

The magnetic permeability of the Ni $5Fe_{0.55}$ layers of the present invention, as illustrated in FIGS. 2, 3 and 4, ranges between about 1600 and 2000, while the saturation ranges between about 15.5 and 16.0 kiloGauss.

Figure 5:
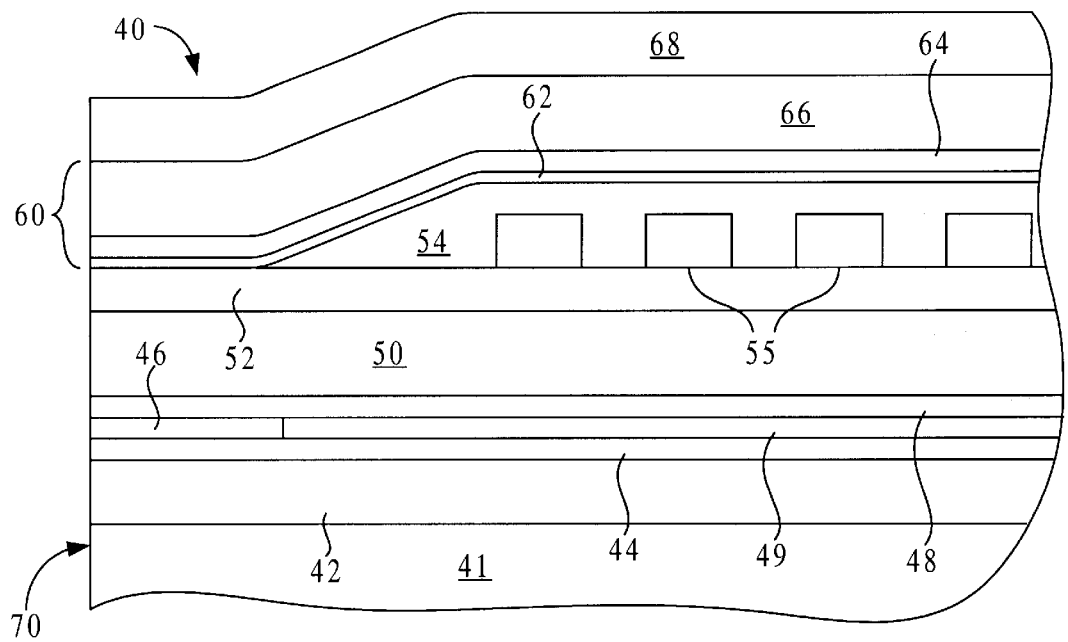
FIG. 5 is a cross-sectional view of a transducer including a magnetically superior layer of FIGS. 2, 3 or 4.

Referring now to FIG. 5, a merged MR and inductive transducer 40 employing magnetically favorable elements of the present invention is depicted. The transducer is formed on a wafer substrate 41, which may contain $Al_2O_3$, AlTiC or other conventional materials. A first magnetically permeable shield layer 42 is disposed atop the substrate 41. A first read gap layer 44 composed of electrically insulative, nonmagnetic material such as $Al_2O_3$ is disposed on shield layer 42. An MR sensor 46 is disposed atop the first read gap layer 44, and a second read gap layer 48 composed of electrically insulative, nonmagnetic material such as $Al_2O_3$ is disposed on the MR sensor. The MR sensor 46 may include a single layer of anisotropic magnetoresistive (AMR) material such as Permalloy, or the sensor may contain plural or multiple layers of sensor materials as is known to form a spin valve (SV) sensor, giant magnetoresistive (GMR) sensor, dual stripe magnetoresistive (DSMR) sensor or other known types of sensing mechanisms. The MR sensor 46 may be trimmed to leave an insulating layer 49 formed of a dielectric such as $Al_2O_3$ distal to a media-facing surface 70.

A second magnetically permeable shield layer 50 is disposed atop the second read gap layer 48, the second shield layer also serving in this merged transducer as a first write pole 50. The layer 50 may be formed of Permalloy or other materials, including magnetically soft $Ni_{0.45}Fe_{0.55}$, and may be laminated with dielectric materials such as $Al_2O_3$ or $SiO_2$ for high frequency performance. Between the first write pole 50 and a second write pole 60 is a write gap 52 made of electrically insulative, nonmagnetic material such as $Al_2O_3$. An electrically conductive coil 55 is formed on the gap 52 for inductively writing and/or reading signals via the pole layers, the coil surrounded by baked photoresist 54 that, together with the write gap forms a stratum separating the write poles.

The second write pole is formed in a plurality of lamina, beginning with a sputter-deposited layer 62 of primarily nickel NiFe, which may be formed to a thickness of 20 Å–50 Å and at an elevated temperature of 100° C. –200° C. Primarily nickel NiFe is defined in the present invention to be an alloy having a greater atomic concentration of nickel than iron, such as $Ni_{0.55}Fe_{0.45}$. Alternatively, the layer 62 may be formed of Cr having a similar thickness, in order to promote favorable growth of subsequently formed $Ni_{0.45}Fe_{0.55}$. Next, a layer 64 of primarily iron NiFe is sputter-deposited at an elevated temperature within the range mentioned above and preferably between about 170° C. and 190° C., to a thickness of about 500 Å–1500 Å, forming a magnetically superior seed layer preferably having a concentration of about $Ni_{0.45}Fe_{0.55}$. Primarily iron NiFe is defined in the present invention to be an alloy having a greater atomic concentration of iron than nickel, such as $Ni_{0.45}Fe_{0.55}$, while a range of between about 50% iron to 60% iron is generally preferred. A layer 66 of primarily iron NiFe such as $Ni_{0.45}Fe_{0.55}$ is then electroplated on the seed layer 64, in order to efficiently extend the thickness of write pole 60 to several microns.

A protective coating layer 68 of $Al_2O_3$, diamond like carbon (DLC) or other hard materials is then formed, after which the wafer substrate 41 and formed layers are diced into thousands of heads. The media-facing surface for transducer 40, is formed along one die edge. One should note that the MR sensor 60 may be formed after the formation of the inductive core that includes write poles 50 and 60, affording higher temperature processing of the write poles. In an alternative embodiment, sensing is performed inductively with the same transducer elements that are used to write magnetic patterns on the media, without needing an MR sensor.

Figure 6:
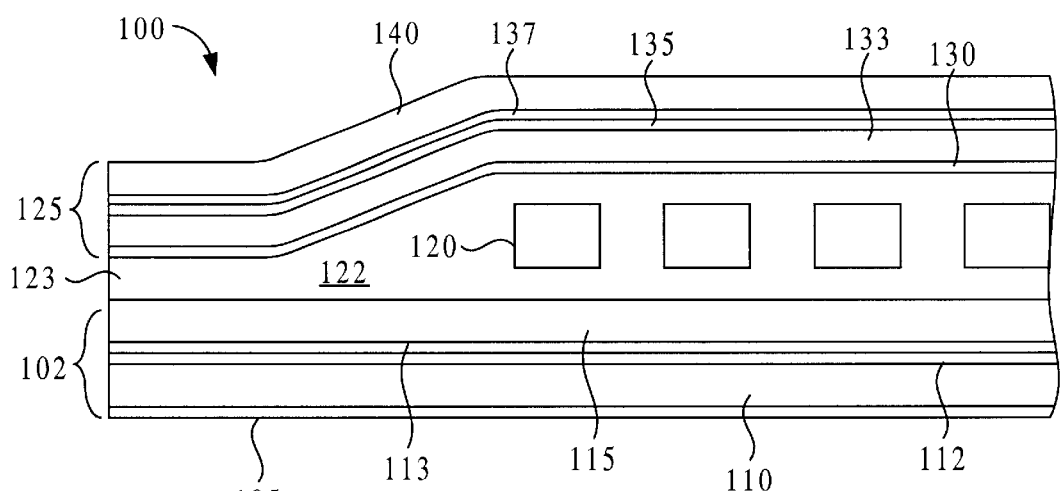
FIG. 6 is a cross-sectional view of a laminated transducer including a magnetically superior layer of FIGS. 2, 3 or 4.

In FIG. 6, an inductive transducer 100 formed with laminated magnetic core layers of the present invention is illustrated. As described above, an MR sensor may already have been formed by conventional means. A first pole layer 102 is formed of a plurality of lamina, beginning with a sputter-deposited seed layer 105 of Cr or $Ni_{0.55}Fe_{0.45}$, which may be formed to a thickness of about 20 Å–50 Å, upon which a much thicker layer 110 of magnetically superior $Ni_{0.45}Fe_{0.55}$ is sputter-deposited to a thickness of about 500 Å–10000 Å. An electrically insulative, a magnetic layer 112 of material such as $Al_2O_3$ or $SiO_2$ is formed, which may have a thickness in a range between about 20 Å–100 Å. A second sputter-deposited seed layer 113 of Cr or $Ni_{0.55}Fe_{0.45}$, which may be formed to a thickness of about 20 Å–50 Å is then formed on the sputtered $Ni_{0.45}Fe_{0.55}$, upon which a second layer 115 of high permeability and high moment $Ni_{0.45}Fe_{0.55}$ is sputter-deposited to a thickness of about 500 Å–1000 Å. Although only two layers of $Ni_{0.45}Fe_{0.55}$ are shown, this laminated pattern can be repeated as needed for reducing eddy currents in the write pole 102. For the situation in which eddy currents are not debilitating, one may avoid depositing the nonmagnetic layers to create a structure of alternating primarily nickel and primarily iron layers, in which the primarily nickel layers are much thinner than the primarily iron layers.

Much as described above, an electrically conductive coil 120 is formed within an electrically insulative, nonmagnetic stratum 122, which may include photoresist surrounding the coil distal to a gap 123, although the coil in this case may include additional windings for improved inductive sensing and/or writing. Formation of a second pole layer 125 atop the stratum 122 begins with sputter-depositing a seed layer 130 of Cr or $Ni_{0.55}Fe_{0.45}$, which may be formed to a thickness of about 20 Å–50 Å, upon which a much thicker layer 133 of magnetically superior $Ni_{0.45}Fe_{0.55}$ is sputter-deposited, to a thickness of about 500 Å–10000 Å. An electrically insulative, a magnetic layer 135 of material such as $Al_2O_3$ or $SiO_2$ is then formed, which may have a thickness in a range between about 20 Å–1000 Å. Another sputter-deposited seed layer 137 of Cr or $Ni_{0.55}Fe_{0.45}$, which may be formed to a thickness of about 20 Å–50 Å is then formed on the sputtered $Ni_{0.45}Fe_{0.55}$, upon which another layer 140 of high permeability and high moment $Ni_{0.45}Fe_{0.55}$ is sputter-deposited to a thickness of about 500 Å–10000 Å. Although only two layers of $Ni_{0.45}Fe_{0.55}$ are shown, this laminated pattern can be repeated as needed for reducing eddy currents in the write pole 125. Alternatively, one may avoid depositing an insulating interlayer to create a structure of alternating chromium and primarily iron layers, in which the chromium layers are much thinner than the primarily iron layers.

Figure 7:
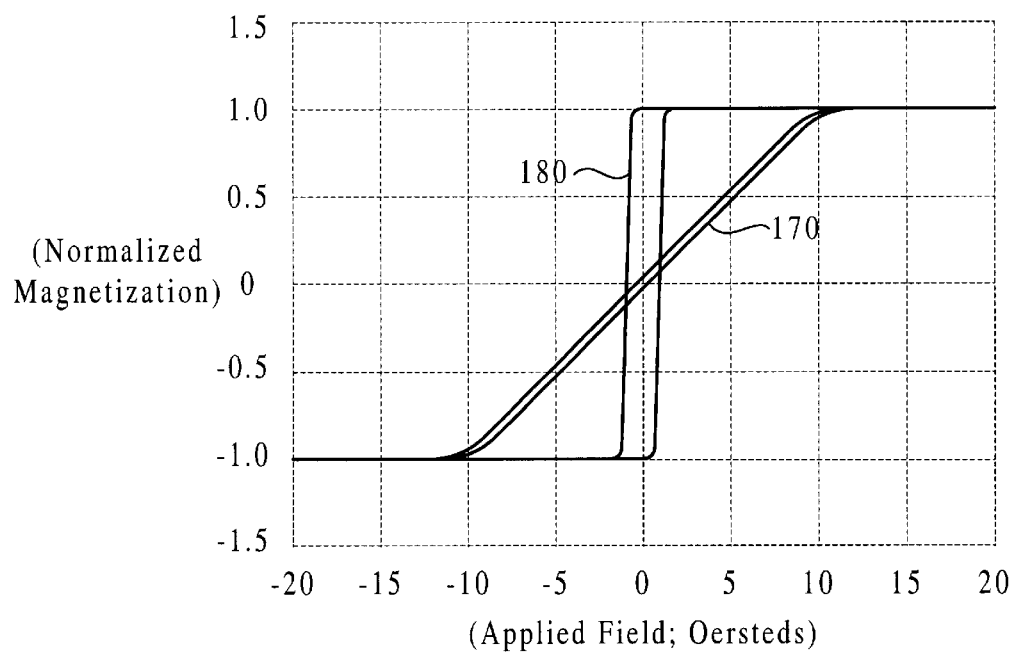
FIG. 7 is a plot of a B/H loop of a magnetically superior laminated layer of FIG. 6, made of a repeating series of layers of $Ni_{0.45}Fe_{55}$ formed on $Al_2O_3$.

FIG. 7 is a plot of a B/H loop of a magnetically superior laminated layer of FIG. 6, made of a repeating series of layers of $Ni_{0.45}Fe_{0.55}$ that was formed on $Ni_{0.45}Fe_{0.55}$ that was formed on $Al_2O_3$. The series includes a 75 Å thick $Al_2O_3$ layer, a 50 Å thick $Ni_{0.45}Fe_{0.55}$ layer and a 1000 Å thick $Ni_{0.45}Fe_{0.55}$ layer. The series is repeated ten times to form the laminated layer whose magnetic characteristics are plotted in FIG. 7. A hard axis B/H loop 170 has a lesser slope than that of an easy axis B/H loop 180, indicating more gradual change of the B field within the layer in response to the H field. As with other embodiments of the present invention, dramatically reduced coercivity and greatly increased permeability are apparent for both the hard and easy axis of this layer, compared to that of the conventional layer shown in FIG. 1.

Figure 8:
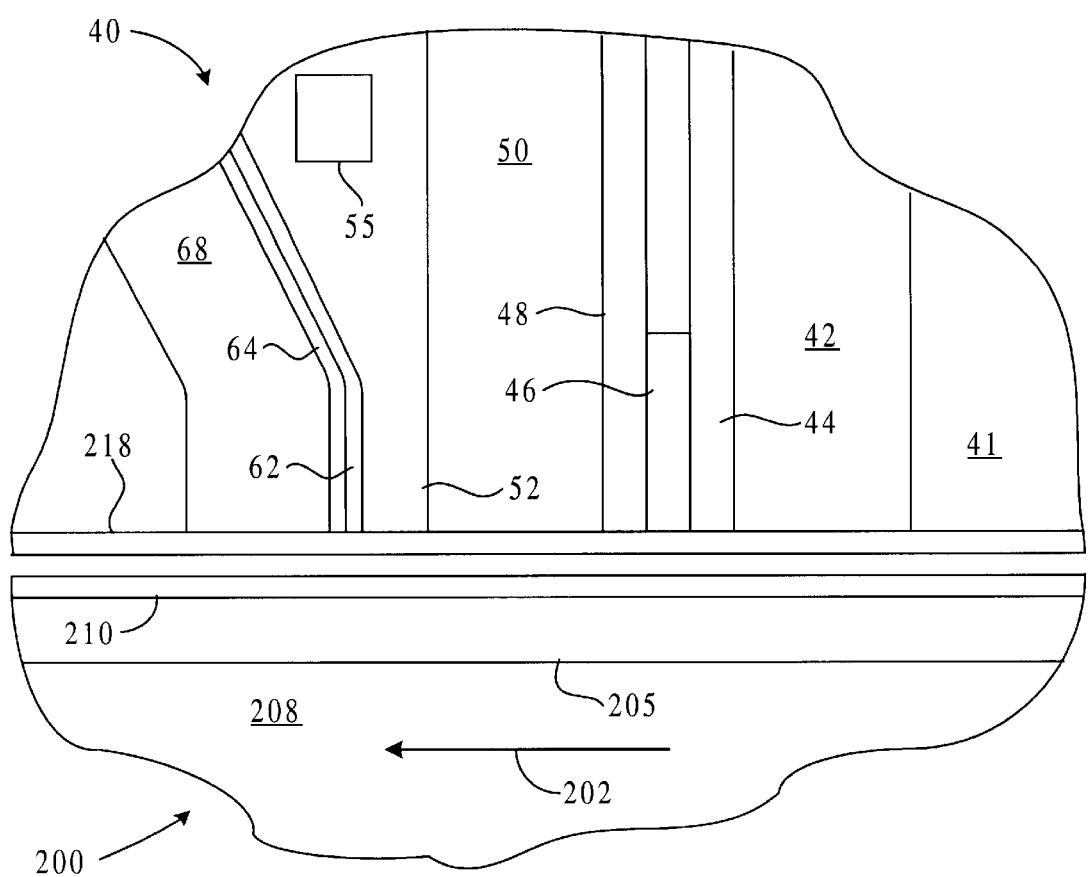
FIG. 8 is a cross-sectional view of a portion of a transducer interacting with a portion of a media, the transducer including high $B_s$ material of the present invention.

FIG. 8 shows the merged transducer 40 of the present invention disposed in close proximity to a media 200 which is moving relative to the head as shown by arrow 202. Note that while the preferred embodiment currently includes a magnetoresistive sensor, the invention is applicable to heads that only write or that employ inductive sensing and/or various other features. The media 200 may be a disk or tape, for example, which includes media layer 205 or layers atop a substrate 208, with an overcoat layer 210 protecting the media A protective coating 218 has also been formed on the media facing surface of the transducer. As described above, in order to form the high permeability, high moment write pole 60, a seed layer 62 of $Ni_{0.55}Fe_{0.45}$ or Cr is formed followed by a second seed layer 64 of $Ni_{0.45}Fe_{0.55}$, after which thicker $Ni_{0.45}Fe_{0.55}$ layer 66 can be plated. The write poles 50 and 60 form a magnetic circuit or loop to encourage the flow of magnetic flux across the write gap. An electrical current flowed through the coil 55 induces a magnetic flux in the write layers that travels across the nonmagnetic gap 52 to write a magnetic bit in the media layer 205. The MR sensor 46 can read magnetic bits that have been written on the media.

Although we have focused on teaching the preferred embodiment, other embodiments and modifications of this invention will be apparent to persons of ordinary skill in the art in view of these teachings. Therefore, this invention is to be limited only by the following claims, which include all such embodiments and modifications when viewed in conjunction with the above specification and accompanying drawings.

What is claimed is:

1. A device for a magnetic transducer, the device comprising:

a first layer of seed material, a second layer of material formed on said first layer, said second layer having an easy axis of magnetization and a hard axis of magnetization, containing NiFe that is primarily iron, and being characterized by a magnetic saturation of at least about fifteen-thousand five-hundred Gauss and a magnetic permeability of at least fifteen-hundred, measured substantially along said hard axis.

2. The device of claim 1, wherein said first layer contains $Ni_{0.55}Fe_{0.45}$.

3. The device of claim 1, wherein said first layer contains chromium.

4. The device of claim 1, wherein said second layer contains $Ni_{0.45}Fe_{0.55}$.

5. The device of claim 1, wherein said first and second layers are sputter-deposited.

6. The device of claim 1, further comprising a primarily iron layer of NiFe electroplated on said second layer.

7. The device of claim 1, further comprising:

a third layer of solid material separated from said first layer by said second layer, and a fourth layer adjoining said third layer, said fourth layer containing NiFe that is primarily iron, and being characterized by a magnetic saturation of at least about fifteen-thousand five-hundred Gauss and a magnetic permeability of at least fifteen-hundred, measured substantially along said hard axis.

8. The device of claim 7, further comprising a nonmagnetic layer adjoining said second and third layers.

9. A laminate for transmitting magnetic flux comprising:

a first solid layer, and a second solid layer adjoining said first solid layer, said second solid layer containing NiFe having a body-centered-cubic crystallographic orientation and consisting primarily of iron.

10. The laminate of claim 9, wherein said first solid layer includes NiFe containing primarily nickel.

11. The laminate of claim 9, wherein said first solid layer includes chromium.

12. The laminate of claim 9, wherein said first solid layer includes $Ni_{0.55}Fe_{0.45}$.

13. The laminate of claim 10, 11 or 12, wherein said first solid layer is sputter-deposited.

14. The laminate of claim 13, further comprising a third solid layer electroplated on said second solid layer.

15. The laminate of claim 9, further comprising:

a third solid layer separated from said first solid layer by said second solid layer, and a fourth solid layer adjoining said third solid layer, said fourth solid layer containing NiFe having a body-centered-cubic crystallographic orientation and consisting primarily of iron.

16. The laminate of claim 15, further comprising a nonmagnetic layer adjoining said second and third solid layers.

17. The laminate of claim 9, wherein said first solid layer has a thickness that is less than about ten nanometers and said second solid layer has a thickness that is greater than about one hundred nanometers.

18. A transducer for reading or writing magnetic signals on an adjacent media, the transducer comprising:

a stratum of nonmagnetic, electrically insulating solid material including a gap disposed adjacent said media, a conductive coil disposed in said stratum, a magnetic layer disposed adjacent said gap and inductively coupled to said coil, said magnetic layer containing primarily-iron NiFe and having an easy axis of magnetization and a hard axis of magnetization, and a seed layer adjoining said gap and said magnetic layer, said seed layer having less magnetic moment than said primarily-iron NiFe and a substantially different magnetic moment than that of $Ni_{0.8}Fe_{0.2}$.

19. The device of claim 18, wherein said seed layer contains $Ni_{0.55}Fe_{0.45}$.

20. The device of claim 18, wherein said seed layer contains chromium.

21. The device of claim 18, wherein said magnetic layer contains $Ni_{0.45}Fe_{0.55}$.

22. The device of claim 18, wherein said seed and magnetic layers are sputter-deposited.

23. The device of claim 18, further comprising a primarily iron layer of NiFe electroplated on said magnetic layer.

24. The device of claim 18, wherein said magnetic layer is characterized by a magnetic saturation of at least about fifteen-thousand five-hundred Gauss and a magnetic permeability of at least fifteen-hundred, measured substantially along said hard axis.

25. The device of claim 18, further comprising:

a dielectric layer separated from said seed layer by said magnetic layer, a base layer separated from said magnetic layer by said dielectric layer, and a ferromagnetic layer adjoining said base layer, said ferromagnetic layer containing NiFe that is primarily iron, and being characterized by a magnetic saturation of at least about fifteen-thousand five-hundred Gauss and a magnetic permeability of at least fifteen-hundred, measured substantially along said hard axis.

26. The device of claim 25, further comprising a nonmagnetic layer adjoining said base layer and said ferromagnetic layer.

* * * * *